(12) United States Patent
Naeyaert et al.

(10) Patent No.: US 10,980,184 B2
(45) Date of Patent: Apr. 20, 2021

(54) AGRICULTURAL BALER AND METHOD OF PROTECTING SUCH BALER FROM OVERLOAD DAMAGE

(71) Applicant: CNH Industrial America LLC, New Holland, PA (US)

(72) Inventors: Karel Naeyaert, Loppem (BE); David S. D'Hondt, Zedelgem (BE); Xavier G. J. M. Bonte, PB Zuidzande (NE); Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/040,898

(22) PCT Filed: Mar. 19, 2019

(86) PCT No.: PCT/EP2019/056879
§ 371 (c)(1),
(2) Date: Sep. 23, 2020

(87) PCT Pub. No.: WO2019/180040
PCT Pub. Date: Sep. 26, 2019

(65) Prior Publication Data
US 2021/0015049 A1    Jan. 21, 2021

(30) Foreign Application Priority Data
Mar. 23, 2018 (BE) .................. 2018/5197

(51) Int. Cl.
*A01F 15/08* (2006.01)
*A01B 61/02* (2006.01)
*A01D 69/08* (2006.01)

(52) U.S. Cl.
CPC ........ *A01F 15/0841* (2013.01); *A01B 61/025* (2013.01); *A01D 69/08* (2013.01)

(58) Field of Classification Search
CPC .. A01F 15/0841; A01F 15/085; A01B 61/025; A01B 61/02; A01B 71/06; A01D 69/08; A01D 69/002; A01D 75/182
See application file for complete search history.

(56) References Cited

U.S. PATENT DOCUMENTS 4,241,654 A * 12/1980 van der Lely ......... A01B 61/00
100/189
5,894,718 A * 4/1999 Hawlas ............... A01F 15/0841
100/88
(Continued)

FOREIGN PATENT DOCUMENTS

DE 29504531 U1 7/1995
EP 2225926 A1 9/2010
(Continued)

OTHER PUBLICATIONS

International Search Report and Written Report for Application No. PCT/EP2019/056879 dated Apr. 25, 2019 (11 pages).

*Primary Examiner* — Adam J Behrens
(74) *Attorney, Agent, or Firm* — Peter Zacharias; Patrick Sheldrake

(57) ABSTRACT

An agricultural baler including a flywheel and a drivetrain for coupling the flywheel to a connector that is arranged to be connected to a power take-off (PTO) of a tractor. The drivetrain includes a decoupling mechanism for decoupling the flywheel from the connector in case of an overload. The decoupling mechanism includes a controllable member that is movable between an engaged state in which the flywheel is coupled to the connector and a disengaged state in which the flywheel is decoupled from the connector. The decoupling mechanism further includes a detector configured for detecting the overload. The detector is configured for pro-
(Continued)

viding an overload signal to the controllable member triggering the controllable member into the disengaged state.

6 Claims, 4 Drawing Sheets

(56) References Cited

U.S. PATENT DOCUMENTS

| | | | | |
|---|---|---|---|---|
| 6,131,714 | A * | 10/2000 | Bosl | A01B 61/025 192/12 C |
| 6,651,416 | B2 * | 11/2003 | Trelstad | A01F 15/0841 56/10.2 R |
| 6,739,439 | B2 * | 5/2004 | Moeller | F16D 67/02 192/14 |
| 7,464,526 | B2 * | 12/2008 | Coenen | A01B 61/025 192/56.1 |
| 8,881,882 | B2 * | 11/2014 | Pardee | F16D 67/06 192/84.91 |
| 8,978,854 | B2 * | 3/2015 | Pardee | F16D 55/36 192/18 B |
| 9,480,204 | B2 * | 11/2016 | Bonte | A01F 15/08 |
| 9,585,297 | B2 * | 3/2017 | Bonte | A01B 61/025 |
| 9,730,391 | B2 * | 8/2017 | Bonte | A01F 21/00 |
| 10,645,880 | B2 * | 5/2020 | Bonte | A01F 15/08 |
| 2003/0000791 | A1 * | 1/2003 | Moeller | A01D 69/10 192/15 |
| 2003/0069102 | A1 * | 4/2003 | Coenen | A01F 15/0841 475/1 |
| 2003/0167939 | A1 * | 9/2003 | Roth | A01F 15/0841 100/342 |
| 2013/0048464 | A1 * | 2/2013 | Pardee | F16D 67/02 192/18 B |
| 2014/0165859 | A1 * | 6/2014 | O'Reilly | A01F 15/0841 100/179 |
| 2016/0000016 | A1 * | 1/2016 | Bonte | A01F 15/0841 188/71.1 |
| 2016/0050850 | A1 * | 2/2016 | Bonte | A01F 15/04 56/10.7 |
| 2016/0081258 | A1 * | 3/2016 | Bonte | A01F 15/0841 74/15.4 |
| 2016/0192593 | A1 * | 7/2016 | Bonte | B60T 11/18 100/219 |
| 2020/0271170 | A1 * | 8/2020 | Tacke | F16D 31/00 |

FOREIGN PATENT DOCUMENTS

| | | |
|---|---|---|
| EP | 2433485 A1 | 3/2012 |
| EP | 2464210 B1 | 12/2013 |
| EP | 3062600 B1 | 1/2018 |
| WO | 2014170318 A1 | 10/2014 |
| WO | 2017116913 A1 | 7/2017 |

* cited by examiner

AGRICULTURAL BALER AND METHOD OF PROTECTING SUCH BALER FROM OVERLOAD DAMAGE

The invention relates to an agricultural baler comprising a flywheel and a drivetrain for coupling the flywheel to a connector that is arranged to be connected to a power take-off (PTO) of a tractor, wherein the drivetrain includes a decoupling mechanism for decoupling the flywheel from the connector in case of an overload. The invention further relates to a method of protecting such a baler from damage due to an overload.

Such an agricultural baler and such a method are known per se, for instance from WO 2014/170318 A1. This prior art document discloses an agricultural baler having a flywheel coupled to a connector via a cardan coupling provided with a torque limiter. The torque limiter is for instance a shearing bolt that may fail when a certain torque is applied to it.

When a blockage occurs in the known agricultural baler, for instance in a packing or rotor area thereof, the flywheel may be hindered in its rotation. As a result the torque transferred through the mechanical coupling from the connector to the flywheel rises quickly. The torque limiter becomes effective after a certain torque threshold has been reached, to prevent damage to parts of the agricultural baler such as the mechanical coupling due to a possible overload. The torque-limiter as known from the prior art is at least to some extent damaged or even completely destroyed when an overload condition occurs. For instance a shearing bolt may be sheared, and a slip clutch may degrade when slipping. After such an overload condition the torque-limiter has to be replaced or repaired, which may take a considerable amount of time during which the agricultural baler can not be used.

The invention therefore has as an object to provide a baler which is arranged to cope with an overload situation without suffering permanent damage that would cause additional down-time. In accordance with one aspect of the invention, this object is achieved through a baler as defined in the preamble of claim 1, wherein the decoupling mechanism comprises a controllable member that is movable between an engaged state in which the flywheel is coupled to the connector and a disengaged state in which the flywheel is decoupled from the connector; and a detector for detecting the overload, wherein the detector is arranged to provide an overload signal to the controllable member triggering the controllable member into the disengaged state.

The detector may provide the advantage that an overload may be detected, even before the torque rises or at least before it rises to levels high enough to damage parts of the agricultural baler. After detection of the overload, the decoupling mechanism may send an overload signal to the controllable member that is then disengaged. In the disengaged state the flywheel is no longer operatively coupled to the connector, so that these parts may rotate independently from each other. As a result of this controlled way of decoupling the flywheel from the connector upon detection of an overload condition, damage to the drivetrain is thereby prevented. After the overload situation has been resolved, the decoupling mechanism may be switched back to the engaged state, after which the baler can be used again. There is no additional down-time since the baler can be used right away by switching the decoupling mechanism to the engaged state.

In an embodiment of the agricultural baler according to the invention the detector comprises a sensor and a controller connected to said sensor so as to receive information from said sensor, wherein the controller is arranged to provide the overload signal to the controllable member on the basis of the information received from the sensor.

The sensor may be used to monitor a condition of the agricultural baler or of the flywheel specifically, and provide the information about the condition to the controller. The controller may then process the information to generate an overload signal if an overload occurs, and provide an overload signal to the controllable member. The overload signal may therefore be based on any condition of the agricultural baler or the flywheel that is a suitable indication of an overload.

The sensor may sense a torque transferred by the drivetrain, a rotational speed of the flywheel, and/or any other relevant condition of the agricultural baler or of the flywheel.

In another embodiment of the agricultural baler according to the invention the controllable member comprises a clutch.

A clutch may allow the decoupling mechanism to be switched from the engaged state to the disengaged state and back without requiring rotation of the connector to be stopped. Stopping rotation of the connector may stall the tractor. The clutch therefore prevents stopping and/or stalling the tractor when switching states to decouple or couple the flywheel. The clutch may be a dry friction clutch, but in view of the high loads exerted on the clutch, a fluid cooled clutch may be preferable. Moreover, the clutch may be a multi-disc clutch.

In yet another embodiment of the agricultural baler according to the invention the drivetrain comprises a transmission that is switchable between a startup state and a running state, wherein in the startup state the transmission is configured to only partially transmit rotational movement of the PTO to the flywheel; in the running state the transmission is configured to fully transmit rotational movement of the PTO to the flywheel.

The flywheel may be large and/or heavy and consequently have a high rotational inertia. Accelerating the flywheel to the desired rotational speed starting from a stand-still requires high torque and may stall a tractor which is incapable of providing such a high torque, e.g. an older, less powerful tractor. The transmission provides the advantage that in the starting state only a part of the rotational movement of the PTO may be transferred to the flywheel to accelerate it more slowly so that a lower torque is necessary. After the flywheel already has some rotational speed, the flywheel may be further accelerated to the desired rotational speed in the running state of the transmission. The transmission therefore allows accelerating the flywheel to the desired rotational speed whilst limiting torque requirement and thereby preventing the tractor from halting.

The transmission may comprise a two-speed gearbox. The gearbox may be a planetary gearbox, which allows the input shaft and output shaft to be arranged in-line. However, other suitable types of gearbox may also be considered. Alternatively, the transmission may comprise a clutch having a fully engaged state, a fully disengaged state and a slipping state between the fully engaged and disengaged states. Here again, the clutch may be a dry friction clutch, a fluid cooled clutch and/or a multi-disc clutch.

In the running state the gearbox may have a transmission ratio of 1:1, i.e. may provide direct engagement between the input and output shafts. In the startup state the gearbox may have a transmission ratio of N:1, wherein N is greater than 1. For example, N may be between 1.5 and 4, and more particularly between 2 and 3.

In yet another embodiment of the agricultural baler according to the invention the controllable member is formed by the transmission, which is further switchable to an inactive state by moving the controllable member to its disengaged state and from the inactive state to either the startup state or the running state by moving the controllable member to its engaged state. The controllable member being formed by the transmission provides the advantages listed above relating to the controllable member, without having to provide additional, separate components. Without the need for additional, separate components the agricultural baler may be manufactured at lower cost and/or may be simpler.

In yet another embodiment of the agricultural baler according to the invention, the agricultural baler further comprises a braking mechanism that is switchable between a non-braked state and a braked state, wherein in the non-braked state the flywheel is free to rotate with the connector and wherein in the braked state the braking mechanism is configured to halt the flywheel and/or to hold the flywheel in a fixed position.

The flywheel may be large and/or heavy, and therefore have a large rotational inertia. When rotating, the flywheel therefore has a large amount of kinetic energy. When a part of the agricultural baler is blocked, the flywheel does not necessarily stop rotating right away. In some cases, due to its large inertia, the flywheel still rotates, providing a part of its kinetic energy to the blocked parts which may fail since they are unable to move due to the blockage. Braking the flywheel with the braking mechanism absorbs at least a part of the kinetic energy of the flywheel, so that blocked parts of the baler are exposed to less or no kinetic energy when blocked, which lowers risk of damaging those parts. Moreover, the braking mechanism may immobilize the flywheel when the baler is not in use, thus reducing ware and tear on movable parts.

In one embodiment of the agricultural baler, the braking mechanism may be configured for direct engagement with the flywheel. In this way braking torque may be applied directly to the flywheel, thus leading to a short load path and effective braking action.

In another embodiment of the agricultural baler according to the invention, the braking mechanism is integrally formed with the transmission.

Integrally forming the breaking mechanism with the transmission may provide the above listed advantages of braking mechanism, without having to provide additional, separate components. Without the need for additional, separate components the agricultural baler may be manufactured at lower cost and/or may be simpler.

In yet another embodiment of the agricultural baler according to the invention, the braking mechanism is formed as a clutch in the transmission, which in the braked state operatively couples the flywheel to a fixed element of the transmission, and which in the non-braked state leaves the flywheel operatively decoupled from the fixed element.

The braking mechanism being formed as a clutch that may connect the flywheel to a fixed element of the transmission provides a practical way of forming a braking mechanism.

Additionally, the braking mechanism being formed as a clutch allows the flywheel to slow down gradually while being braked. As a result the braking mechanism can gradually convert the kinetic energy from the flywheel to thermal energy and dissipate the thermal energy gradually, so that they may not heat up too much. When the braking mechanism heats up too much it may fail.

Furthermore, the transmission normally constitutes a sturdy and structurally strong component of the baler, which is capable of absorbing loads caused by braking the flywheel.

In yet another embodiment of the agricultural baler according to the invention, the braking mechanism and the decoupling mechanism are formed as a double acting clutch, wherein in the braked state the double acting clutch operatively couples the flywheel to the fixed element of the transmission and in the non-braked state the double acting clutch operatively couples the flywheel to the connector.

When the braking mechanism and the decoupling mechanism are separately controllable, a situation could arise in which the braking mechanism might be braking the flywheel, whilst the decoupling mechanism would be in the engaged state so that the flywheel would be powered by the PTO. This might result in damage to the parts of the agricultural baler such as the PTO, the transmission, the brake and/or other parts. The double acting clutch provides the advantage that it brakes when it is not engaged and does not brake when it is engaged. The double acting clutch thereby helps to prevent a situation in which the braking mechanism is engaged whilst the flywheel is being driven by the PTO. Furthermore the double action clutch can be controlled by a single signal, whilst a separate braking mechanism and a separate decoupling mechanism would normally require two or more signals. The control of the double action clutch is therefore relatively easy.

It will be appreciated that the double acting clutch, when operatively coupling the flywheel to the fixed element of the transmission to provide braking, has disengaged the flywheel from the connector (i.e. the disengaged state). Conversely, when operatively coupling the flywheel to the connector (i.e. the engaged state), the double acting clutch cannot at the same time operatively couple the flywheel to the fixed element. In this way the double acting clutch may form the braking mechanism and the decoupling mechanism, in a single part.

In yet another embodiment of the agricultural baler according to the invention, the transmission comprises a gearbox, wherein in the startup state the flywheel is operatively coupled to the connector via a first mechanically linked path having a first transmission ratio and in the running state the flywheel is operatively coupled to the connector via a second mechanically linked path having a second transmission ratio, which is different from the first transmission ratio, wherein in the stopping state the flywheel is operatively coupled via both the first mechanically linked path and the second mechanically linked path, which in the stopping state are interconnected such that they form a fixed element.

The transmission being formed by a gearbox with the mechanically linked paths offers a practical way to provide the startup and running states. Because different transmission ratios are associated with the startup and running states, enabling both mechanically linked paths at the same time allows for no rotation at all. In this way the gearbox may form a fixed element, without the need to provide any additional components. This embodiment may therefore be manufactured at relatively low cost and/or may be structurally simple.

In yet another embodiment of the agricultural baler according to the invention, the detector is configured to also provide the overload signal to the braking mechanism so as to switch the braking mechanism to the braked state.

Also triggering the braking mechanism to brake the flywheel when an overload is detected allows for a substantially automatic overload protection system. Such an automatic system may be relatively quick, so that the flywheel may be slowed down or stopped before damage occurs to any parts of the baler. The detector may be configured to provide the overload signal to the braking mechanism with a slight delay. In this way the controllable member can decouple the flywheel from the connector and the PTO before braking action is applied to the flywheel.

In yet another embodiment of the agricultural baler according to the invention, the agricultural baler further comprises a hydraulic pump, which is operatively coupled to the connector via a second drivetrain so that the hydraulic pump can be driven by the PTO even when the decoupling mechanism is in the disengaged state.

The hydraulic pump is often used to power moving parts of the baler. When the hydraulic pump is operatively coupled to the connector via a second drivetrain the hydraulic pump can be driven when the decoupling mechanism is in the disengaged state. When a blockage of the baler occurs, because of for instance a jamming, an overload situation occurs, resulting in disengagement of the decoupling mechanism as explained above. The hydraulic pump in this embodiment can still provide power to certain parts of the baler, even after disengagement of the flywheel. This may be vital if said certain parts require power to move in order to remove the jamming and thus the blockage.

In accordance with yet another aspect of the invention, a method is provided for protecting an agricultural baler having a flywheel that is driven by a PTO of a tractor from damage in the event of blockage of a part of the baler. The method of the invention comprises the steps of: monitoring the baler during operation; and when an overload as a result of blockage is detected, decoupling the flywheel from the PTO by moving a controllable member to a disengaged state.

In an embodiment, the method further comprises the step of braking the flywheel after it has been decoupled from the PTO.

The invention will be further elucidated with reference to the drawings, in which.

In the example configurations of FIGS. 3A-3C like elements are represented by like reference numerals incremented by 100.

Figure 1:
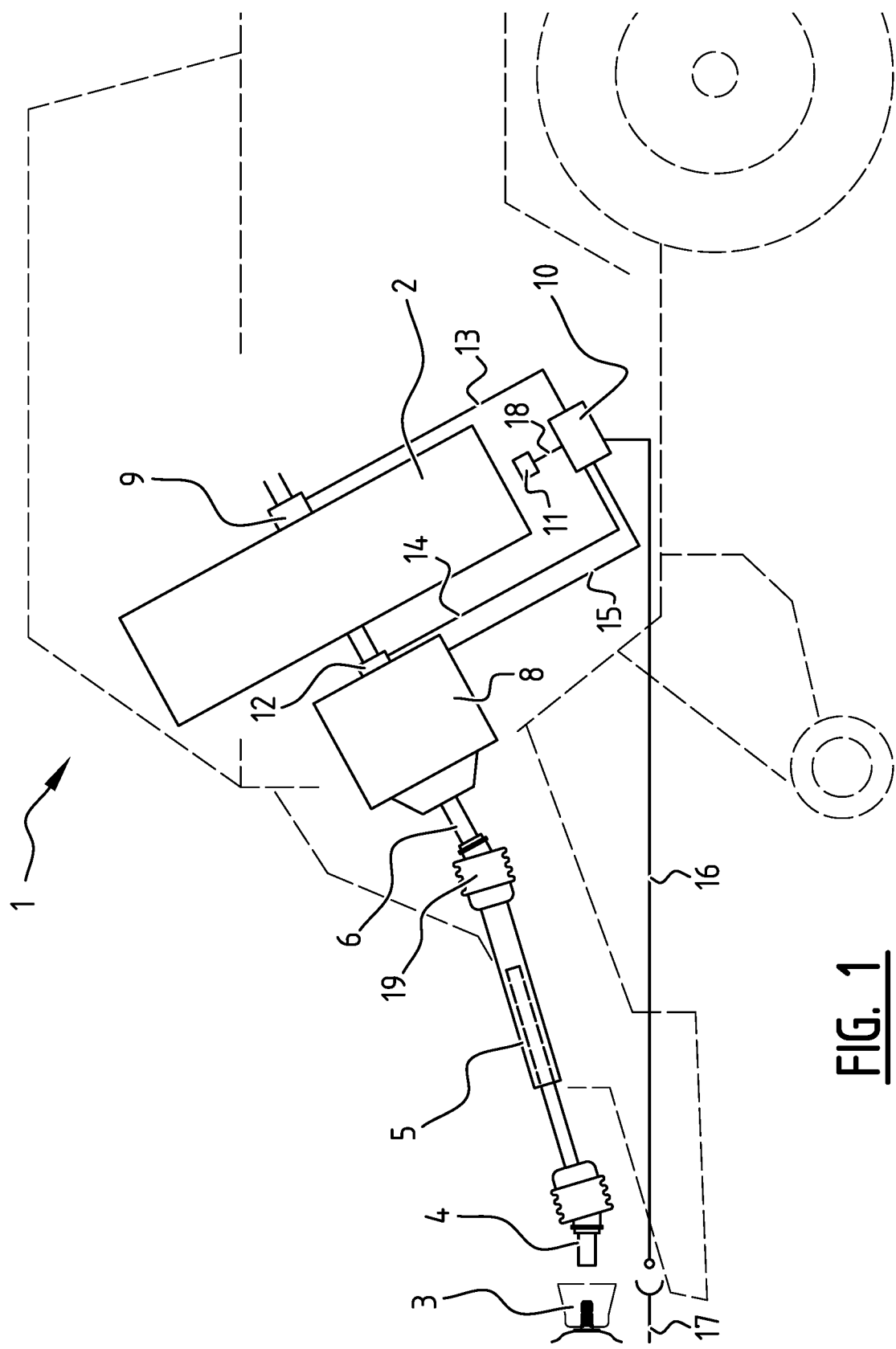
FIG. 1 shows a schematic representation of an agricultural baler in accordance with an embodiment of the invention having a flywheel and a drivetrain for connecting the flywheel to the power take-off (PTO) of a tractor.

FIG. 1 shows an agricultural baler 1 according to the invention. The agricultural baler 1 has a flywheel 2 that is relatively large and heavy, and therefore has a high inertia when it is rotated during operation of the agricultural baler 1. The flywheel 2 can be driven by a power take-off (PTO) 3 of a tractor (not shown) by means of a connector 4 and a drivetrain. The drivetrain between the flywheel 2 and the connector 4 may comprise a cardan coupling, a homokinetic coupling or any other type of mechanical coupling which allows the rotational movement of the connector 4 to be transferred to the flywheel 2. In the illustrated embodiment the drivetrain comprises primary and secondary drive shafts 5 and 6. The drive shafts 5, 6 are coupled to each other by a cardan coupling 19, and the primary drive shaft 5 is telescopic to accommodate irregularities in the movement of the cardan coupling.

In this embodiment the flywheel 2 is coupled to the secondary drive shaft 6 via a transmission 8 which is part of the drivetrain, e.g. a two-speed gearbox or a clutch of the type disclosed in WO 2014/170318 A1. The transmission 8 serves to prevent the engine of the tractor from stalling when starting the baler 1 and bringing the flywheel 2 into rotation. A signal that is indicative of the engine RPM is sent over a line 17 and a connector to a line 16, which leads to a controller 10. The controller 10 sends a control signal to the transmission 8 over a line 15. On the basis of this control signal the transmission 8 may switch between its startup and running states. When the agricultural baler 1 is in use, the flywheel 2 rotates at a speed of for instance 1000 rpm, although other speeds may of course be possible. If a blockage of the flywheel 2 occurs it can no longer rotate so that rotational movement from the PTO 3 cannot be passed to the flywheel 2. Consequently, the transferred torque through the decoupling mechanism rises, possibly causing damage to parts of the agricultural baler 1.

To prevent this, the drivetrain further comprises a decoupling mechanism. The decoupling mechanism comprises a detector and a controllable member that is movable between an engaged state and a disengaged state. In this embodiment the detector comprises a sensor 11 which sends signals over a line 18 to the controller 10, which in turn controls the movement of the controllable member. In this embodiment the controllable member may be a clutch 12 arranged between the flywheel 2 and the transmission 8.

The sensor 11 in this example monitors torque delivered to the flywheel 2, but may alternatively monitor the rotational velocity of the flywheel 2 or any other suitable condition that may provide an indication of possible blockage of the flywheel 2 or the agricultural baler 1. The sensor 11 is connected to the controller 10 so as to provide it with a signal indicative of the torque delivered. The controller 10 in this example compares the signal to a threshold value and sends an overload signal to the controllable member 12 over a line 14 if the delivered torque is above the threshold value. In a normal state of use of the agricultural baler 1 the controllable member is in the engaged state. In the engaged state a rotational movement of the connector 4 (taken from the PTO 3) may be transferred by the decoupling mechanism to the flywheel. When the controller 10 sends the overload signal, the controllable member is triggered to move to the disengaged state. In the disengaged state no rotational movement of the connector 4 (and thus the PTO 3) may be transferred to the flywheel 2.

In this example the agricultural baler 1 further includes a braking mechanism 9. The braking mechanism 9 is shown to be arranged adjacent the flywheel 2, and can engage directly with the flywheel 2 or its rotating shaft. The braking mechanism 9 is also connected to the controller 10 via a line 13, so that the controller 10 can also send the overload signal to the braking mechanism 9. In a normal state of use of the agricultural baler 1 the braking mechanism 9 is in a non-braked state, in which the flywheel 2 is not braked and may rotate freely with respect to the braking mechanism 9. The overload signal will trigger the braking mechanism 9 to switch to a braked state in which the flywheel 2 is slowed down and halted. This is normally done after the flywheel 2 has been decoupled from the connector 4, so that only the freewheeling flywheel 2 needs to be braked, rather than the movement taken from the PTO 3.

Additionally, the braking mechanism 9 may be activated when the agricultural baler 1 is not in use but is being transported or stored so as to hold the flywheel 2 in a fixed position. Because the flywheel 2 is relatively large and heavy, the flywheel has a large rotational inertia. When the flywheel 2 is rotating, it therefore has a large kinetic energy. When a blockage occurs, the overload signal is sent by the controller 10, so that the flywheel 2 is disengaged from the connector 4 and the braking mechanism 9 is activated. The PTO 3 may therefore keep rotating without causing damage to any part of the agricultural baler 1, and the braking mechanism 9 may absorb a part of that large kinetic energy. The part of the agricultural baler 1 that is blocked will therefore absorb less kinetic energy, and consequently will not be damaged.

The agricultural baler 1 further includes a hydraulic pump (not shown) connected to the connector 4 via a second drivetrain (not shown). This separate second drivetrain ensures that the hydraulic pump will be operational, even if the flywheel 2 is decoupled from the connector 4.

Figure 2:
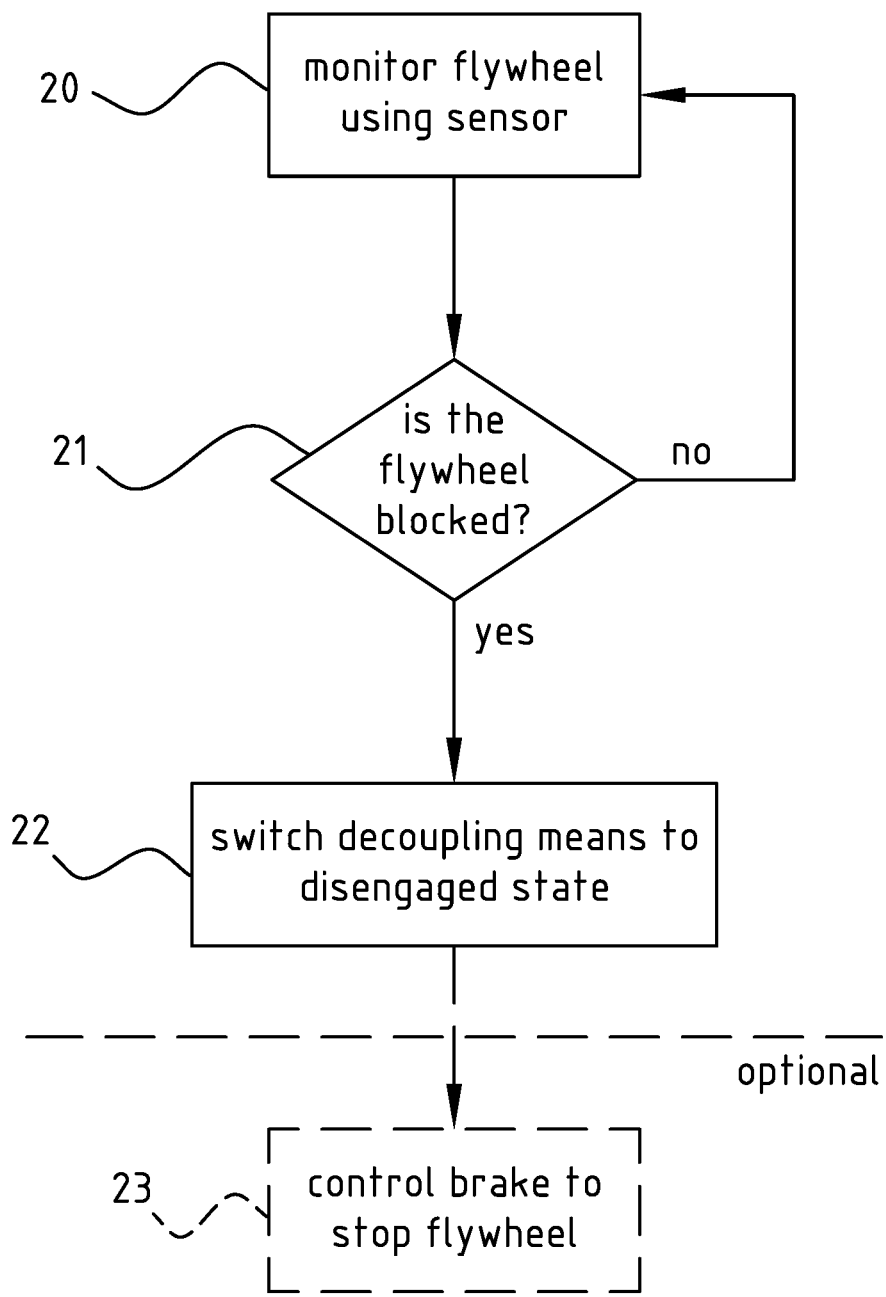
FIG. 2 shows a scheme representing a method of operating an agricultural baler according to the invention.

FIG. 2 shows the various steps of a method of protecting the agricultural baler 1 from damage in the event of blockage. The method includes a monitoring step 20 in which the flywheel 2 is monitored using the sensor 11. Based on the information received by the sensor 11, it is determined in a determination step 21 if the flywheel 2 is blocked. This determination step 21 may be performed by controller 10. As long as the flywheel 2 is not blocked, the method returns to step 20 to keep monitoring the flywheel 2. In case of a blockage, however, the controller 10 may send the overload signal so that in a disengagement step 22 the decoupling mechanism may be switched to the disengaged state. In principle these steps 20-22 are sufficient to prevent damage to the various parts of the baler 1 and its drive mechanism. Optionally, in a braking step 23 the braking mechanism 9 is used to stop the flywheel 2 from rotating and to absorb the kinetic energy involved in this rotation.

In the embodiment of FIG. 1 the controllable member 12 and the braking mechanism 9 is shown as a separate element acting on the flywheel 2 or its drive shaft. This arrangement can be used both for flywheels which are directly driven from the PTO and for flywheels which are driven through a transmission, as shown in FIG. 1. However, it is also possible to integrate the controllable member 12 and/or the braking mechanism 9 in the transmission 8. Such integration leads to a reduction of the number of parts and to a more compact and simpler structure. In the following three embodiments both the controllable member 12 and the braking mechanism 9 have been integrated into the transmission 8.

Figure 3A:
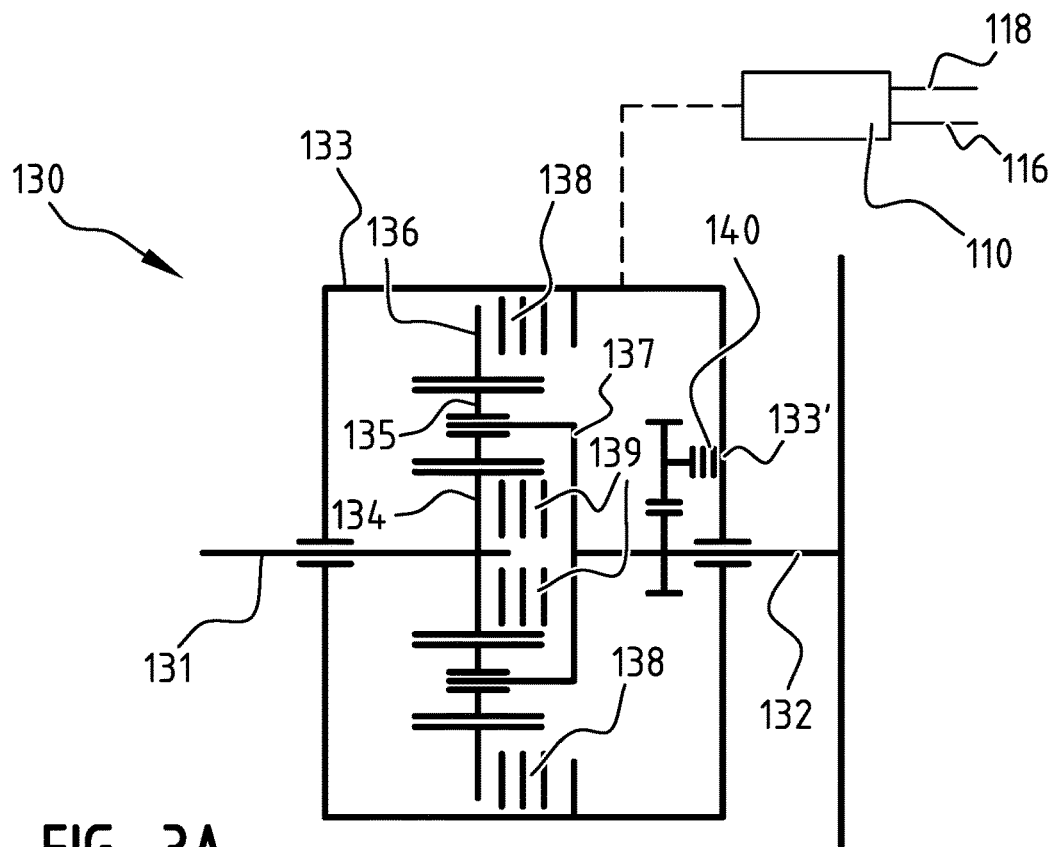
FIGS. 3A-3C schematically show different exemplary configurations of a gearbox that may be used as a decoupling mechanism and transmission in accordance with the invention.

FIG. 3A shows a gearbox that may be part of agricultural baler 1 according to the invention. In particular, the gearbox forms part of the transmission 130 which is switchable between a startup state and a running state. The transmission 130 may transfer rotational movement from an input shaft 131 to an output shaft 132. The input shaft 131 may be the secondary drive shaft 6, and the output shaft may be connected to the flywheel 2.

In this embodiment the transmission 130 comprises a housing 133 to be arranged fixedly in agricultural baler 1. Inside the housing 133 the transmission 130 includes a planetary gear system including a sun gear 134, planetary gears 135 and a ring gear 136. The planetary gears 135 are rotatably mounted on a carrier 137. The sun gear 134 is coupled to input shaft 131. The carrier 137 is coupled to the output shaft 132. The transmission 130 further includes a ring clutch 138 and a carrier clutch 139. The ring clutch 138 may couple or decouple the ring gear 136 to/from the housing 133, so as to stop the ring gear 136 from rotating with respect to the housing 133 when they are coupled. The carrier clutch 139 may couple or decouple the sun gear 134 to/from the carrier 137, so as to stop rotation of the carrier 137 with respect to the sun gear 134 when they are coupled.

In the starting state the ring clutch 138 couples the ring gear 136 to the housing 133, while the carrier clutch 139 decouples the sun gear 134 from the carrier 137. Rotation of the sun gear 134 will then result in rotation of the planet gear 135 and of carrier 137 around the sun gear 134. In the running state the ring clutch 138 decouples the ring gear 136 from the housing 133, while the carrier clutch 139 couples the sun gear 134 to the carrier 137. Rotation of the sun gear 134 will then result in equal rotation of the carrier 137.

As stated above, in this embodiment the transmission 130 further includes a controllable member 12 which in this case is formed by the ring clutch 138 and the carrier clutch 139. The transmission 130 further includes brake mechanism 9, which in this case comprise a braking clutch 140 that may couple or decouple the output shaft 132 to/from a fixed element 133' of the transmission 130. In this case the fixed element 133' is part of the housing 133. When the braking clutch 140 couples the fixed element 133' to output shaft 132, the output shaft 132 and thus flywheel 2 may be braked.

FIG. 3A further shows controller 110 that is arranged to control ring clutch 138, carrier clutch 139 and braking clutch 140. The controller 110 receives signals from the tractor (via line 116) for controlling the switching of the transmission 130 between the startup and running states, depending on the tractor engine RPM. This function of the controller 110 leads to operation of the transmission 130 in the way that is described in detail in WO 2014/170318 A1. The controller 110 further receives signals from the detector 11 (via line 118) for controlling movement of the controllable member between its engaged and disengaged states, depending on the state of the flywheel 2.

When the controller 110 sends the overload signal, the ring clutch 138 and the carrier clutch 139 are declutched. Consequently the sun gear 134 and thus the input shaft 131 may rotate freely from the output shaft 132. The transmission 130 thereby provides a disengaged state, in which the flywheel 2 is decoupled from input shaft 131 and from the connector 4 and PTO 3. When the controller sends the overload signal, the braking clutch 140 may additionally couple the output shaft 132 to the fixed element 133' thereby braking the output shaft 133 and thus the flywheel 2, providing a braked state.

Figure 3B:
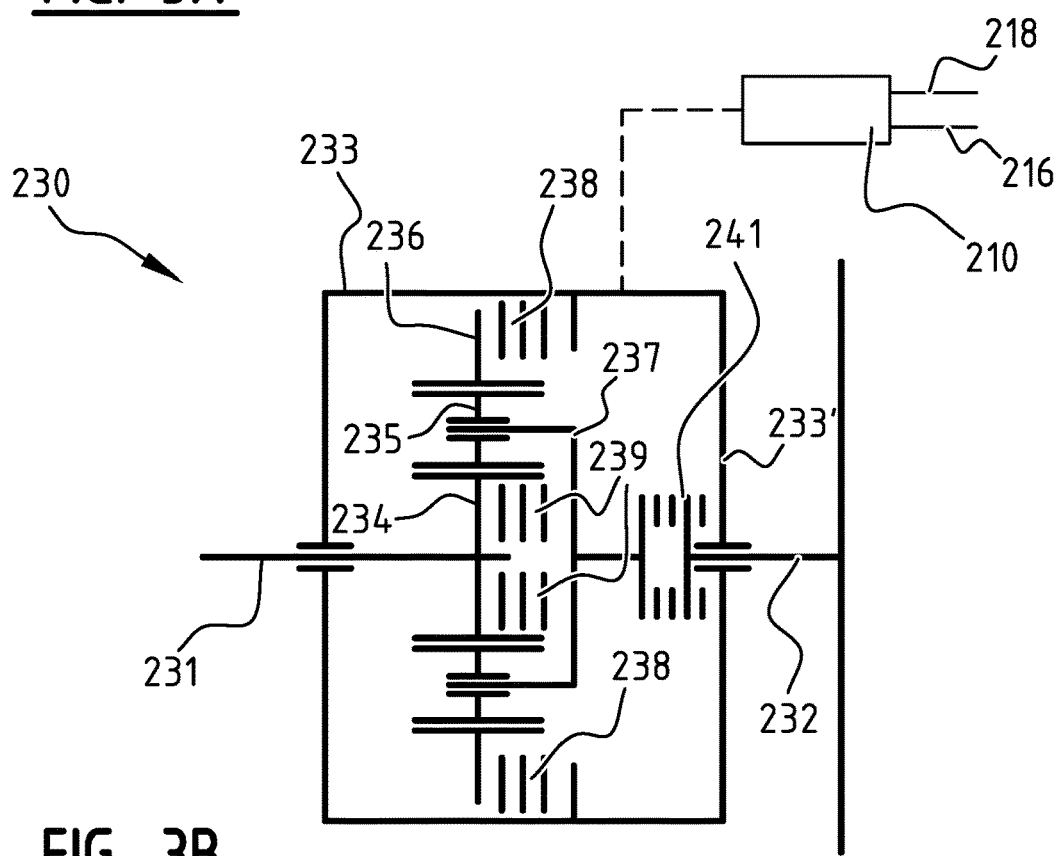

FIG. 3B shows an alternative embodiment of the transmission 130 of FIG. 3A. Only the differences of this transmission 230 with respect to the transmission 130 of FIG. 3A are described below. Instead of braking clutch 140 this gearbox includes a double action clutch 241. The double action clutch 241 couples the flywheel 2 to either the fixed element 233' or to carrier 237. As a result the double action clutch 241 provides a state in which the output shaft 232 and thus the flywheel 2 is braked and the flywheel 2 is disengaged from the input shaft 231, and a state in which the output shaft 232 and thus the flywheel 2 is not braked and is coupled via carrier 237 to input shaft 231. The transmission 230 therefore includes both the decoupling mechanism and the braking mechanism. The controller 210 is arranged to instruct the double action clutch 241 to switch to the braking, disengaged state when an overload is detected. The controller may at the same time (or with a brief delay) instruct one or both of the ring clutch 238 and the carrier clutch 239 to decouple.

Figure 3C:
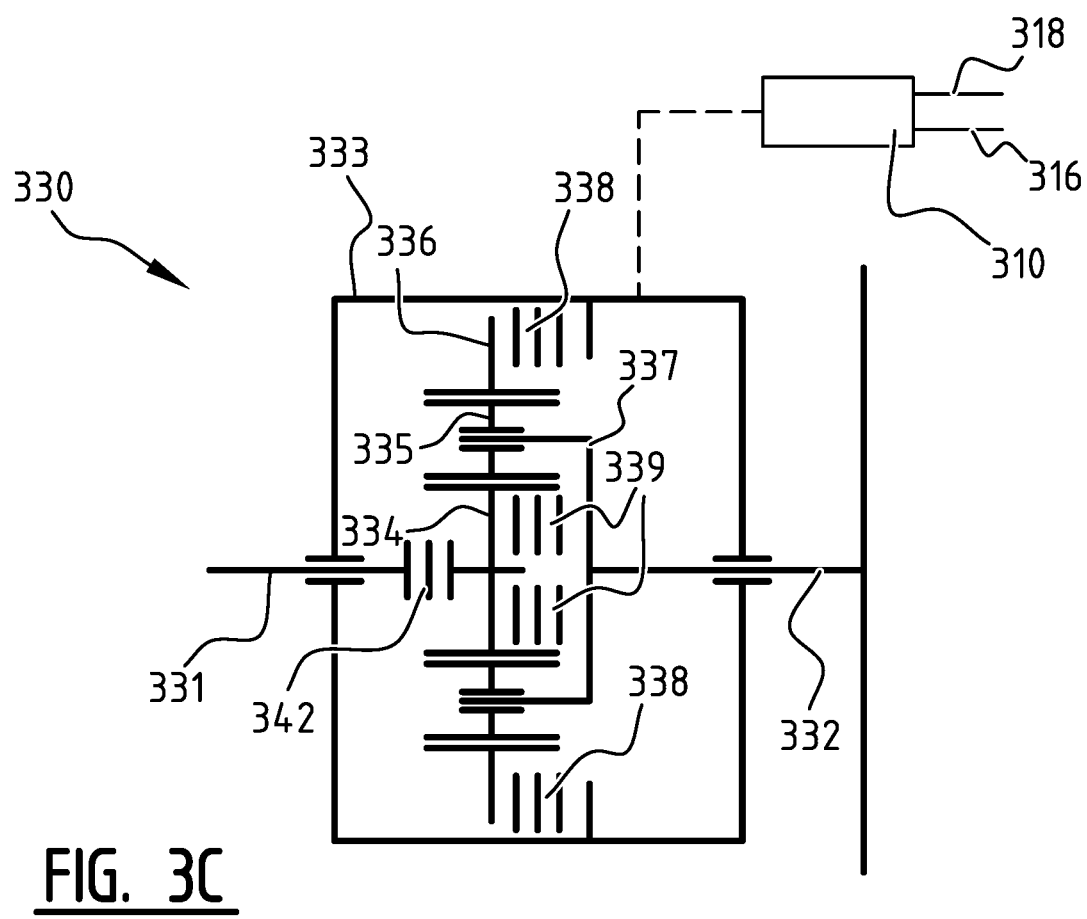

FIG. 3C shows yet another embodiment of the transmission 130, 230 of FIGS. 3A and 3B. Only the differences of this transmission 330 with respect to the transmission 230 of FIG. 3B are described below. This transmission 330 does not include a double action clutch 241. Instead, an input clutch 342 is provided between the input shaft 331 and the sun gear 334. The input clutch 342 may couple the input shaft 331 to sun gear 334 or decouple them. Controller 310 is arranged to instruct input clutch 342 to decouple by sending the overload signal. When the input clutch 342 is decoupled, input shaft 331 may rotate freely from output shaft 332 and thus from flywheel 2. The controller 310 is arranged to simultaneously (or with a brief delay) instruct ring clutch 338 and carrier clutch 339 to couple upon sending the overload signal. When the ring clutch 338 and carrier clutch 339 are coupled, the sun gear 334, the carrier 337 and ring gear 339 can no longer rotate with respect to each other so that the complete planetary gear system is blocked. The planetary gear system therefore forms a fixed element which is connected to output shaft 332. The planetary gear system therefore effectively forms a braking mechanism. The controller 310 is arranged to instruct at least one of the ring clutch 338 and the carrier clutch 339 to decouple when the input clutch 342 is coupled.

Although the invention has been illustrated above by reference to some exemplary embodiments thereof, it is not limited thereto, but may be amended and modified in many ways. All novel features of the invention may be used not only in combination, but also in isolation, while retaining the advantages associated with these features. For instance, the decoupling mechanism and the braking mechanism might be used in an agricultural baler which does not include any transmission. The decoupling mechanism could also be used without any braking mechanism. Consequently, the scope of the invention is solely defined by the following claims.

The invention claimed is:

1. An agricultural baler comprising:
   a flywheel; and
   a drivetrain for coupling the flywheel to a connector that is arranged to be connected to a power take-off (PTO) of a tractor, the baler including a decoupling mechanism for decoupling the flywheel from the connector in case of an overload, the decoupling mechanism comprising:
   a controllable member positioned on the drivetrain between the flywheel and connector that is moveable between an engaged state in which the flywheel is coupled to the connector and a disengaged state in which the flywheel is decoupled from the connector;
   a detector for detecting the overload, the detector is configured to provide an overload signal to the controllable member triggering the controllable member into the disengaged state; and
   a braking mechanism in direct engagement with the flywheel that is switchable between a non-braked state and a braked state,
   wherein in the non-braked state the flywheel is free to rotate with the connector,
   wherein in the braked state the braking mechanism is configured to halt the flywheel or to hold the flywheel in a fixed position, and
   wherein the detector is further configured to provide the overload signal to the braking mechanism after the controllable member is triggered into the disengaged state so as to switch the braking mechanism to the braked state.

2. The agricultural baler according to claim 1, wherein the detector comprises a sensor and a controller connected to the sensor so as to receive information from the sensor, wherein the controller is configured to provide the overload signal to the controllable member on the basis of the information received from the sensor.

3. The agricultural baler according to claim 1, wherein the controllable member comprises a clutch.

4. The agricultural baler according to claim 1, wherein the drivetrain comprises a transmission that is switchable between a startup state and a running state, wherein:
   in the startup state the transmission is configured to only partially transmit rotational movement of the PTO to the flywheel; and
   in the running state the transmission is configured to fully transmit rotational movement of the PTO to the flywheel.

5. The agricultural baler according to claim 4, wherein the controllable member is formed by the transmission, which is further switchable to an inactive state by moving the controllable member to its disengaged state and from the inactive state to either the startup state or the running state by moving the controllable member to its engaged state.

6. The agricultural baler according to claim 1, further comprising a hydraulic pump, which is operatively coupled to the connector via a second drivetrain so that the hydraulic pump can be driven by the PTO even when the controllable member is in the disengaged state.

* * * * *